(12) United States Patent
Bichot et al.

(10) Patent No.: US 8,855,133 B2
(45) Date of Patent: Oct. 7, 2014

(54) SYSTEM AND METHOD FOR IMPROVING THE FILE TRANSMISSION RELIABILITY

(75) Inventors: Guillaume Bichot, La Chapelle Chaussee (FR); Christopher Howson, Corps-Nuds (FR); Vincent Alleaume, Pace (FR)

(73) Assignee: Thomson Licensing, Issy les Moulineaux (FR)

( * ) Notice: Subject to any disclaimer, the term of this patent is extended or adjusted under 35 U.S.C. 154(b) by 299 days.

(21) Appl. No.: 12/736,310

(22) PCT Filed: Apr. 9, 2009

(86) PCT No.: PCT/EP2009/002645
§ 371 (c)(1),
(2), (4) Date: Sep. 28, 2010

(87) PCT Pub. No.: WO2009/124768
PCT Pub. Date: Oct. 15, 2009

(65) Prior Publication Data
US 2011/0019690 A1  Jan. 27, 2011

(30) Foreign Application Priority Data

Apr. 11, 2008 (EP) .................................... 08300177

(51) Int. Cl.
| H04J 3/26 | (2006.01) |
| H04L 1/00 | (2006.01) |
| H04L 29/08 | (2006.01) |
| H04L 1/16 | (2006.01) |
| H04L 12/18 | (2006.01) |

(52) U.S. Cl.
CPC .............. *H04L 67/06* (2013.01); *H04L 1/0007* (2013.01); *H04L 1/1635* (2013.01); *H04L 12/1863* (2013.01)

USPC ............ 370/432; 370/465; 709/230; 709/268

(58) Field of Classification Search
None
See application file for complete search history.

(56) References Cited

U.S. PATENT DOCUMENTS

| 6,941,501 B2 | 9/2005 | Eguchi et al. |
| 8,111,694 B2 * | 2/2012 | Pohjolainen et al. ......... 370/392 |

(Continued)

FOREIGN PATENT DOCUMENTS

| JP | 11502989 | 3/1999 |
| JP | 2002124992 | 4/2002 |

(Continued)

OTHER PUBLICATIONS

Djama et al., "Adaptive Cross-Layer Fragmentation for Reliable Wireless IPTV Services", Global Information Infrasturcture Symposium, 2007, Jul. 2, 2007, pp. 203-206.

(Continued)

*Primary Examiner* — David Oveissi
(74) *Attorney, Agent, or Firm* — Tutunjian & Bitetto, P.C.

(57) ABSTRACT

The present invention concerns a method at a file server for sending more than one file to more than one receiver, comprising the steps of aggregating the files into a container, splitting the container into more than one packet, and transmitting the more than one packet to the more than one receiver, wherein, the reception of at least one packet of the container enables a receiver to request the reception of lost packets of the container. To this end, the method comprises the steps of receiving an indication of the number of consecutive lost packets of the container per the more than one receiver and adapting the size of the container, in function of the number of consecutive lost packets at the receivers.

10 Claims, 5 Drawing Sheets

(56) References Cited

U.S. PATENT DOCUMENTS

| | | |
|---|---|---|
| 2005/0182842 A1 | 8/2005 | Walsh et al. |
| 2006/0023732 A1 | 2/2006 | Vedantham et al. |
| 2006/0123099 A1 | 6/2006 | Paila et al. |
| 2007/0255921 A1* | 11/2007 | Gole et al. .................. 711/170 |
| 2009/0177942 A1* | 7/2009 | Hannuksela et al. ......... 714/752 |

FOREIGN PATENT DOCUMENTS

| | | |
|---|---|---|
| JP | 2007503741 | 2/2007 |
| JP | 2007508779 | 4/2007 |
| JP | 2008512014 | 4/2008 |
| WO | WO9631020 | 10/1996 |
| WO | WO2005022852 | 3/2005 |
| WO | WO2005039131 | 4/2005 |
| WO | WO2006024343 | 3/2006 |
| WO | WO2007078253 | 7/2007 |
| WO | WO2008027253 | 3/2008 |
| WO | WO2008094108 | 8/2008 |

OTHER PUBLICATIONS

Search Report Dated July 20, 2009.

* cited by examiner

SYSTEM AND METHOD FOR IMPROVING THE FILE TRANSMISSION RELIABILITY

This application claims the benefit, under 35 U.S.C. §365 of International Application PCT/EP2009/002645, filed Apr. 9, 2009, which was published in accordance with PCT Article 21(2) on Oct. 15, 2009 in English and which claims the benefit of European patent application No. 08300177.6, filed on Apr. 11, 2008.

FIELD OF THE INVENTION

The present invention relates generally to video broadcast to mobile receivers and in particular to a method and system for improving the transmission reliability.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

A distribution of content between a server and multiple receivers requires either to set up a point-to-point connection between the server and each receiver, or a multipoint connection. The point-to-point connection permits to distribute the content in a unicast means to each receiver, and provides a robust distribution. However with a significant number of receivers, it requires a heavy management of the connections. It may also dramatically increase the traffic over the network. The multicast distribution provides less network load, with a less robust distribution due to the absence of an acknowledgement mechanism. When multicast distribution is used, a solution must be found for repairing errors in the reception; for example, by means of retransmission demands. As an example of multicast delivery of content, IETF RFC 3926 defines the File Delivery over Unidirectional Transport protocol, noted FLUTE. The protocol defined in this standard is well adapted to answer the problems of scalability in terms of number of clients and heterogeneity in terms of bandwidth supported by the clients.

The standard DVB-H IP Data-casting standard, <<ETSI TS 102 472 V1.1.1 (2006 Jun.), Digital Video Broadcasting (DVB); IP Datacast over DVB-H; Content Delivery Protocols (CDP)>>, noted CDP standard hereinafter, defines a file repair mechanism. The file repair strategy adopted in the CDP standard is a one level file repair strategy and adopts the centralized client-server "File Repair" mode. It uses a file repair mechanism to assist the FLUTE protocol for achieving reliable file delivery other broadcast/multicast networks. Once it has detected the reception of an incomplete file, the FLUTE receiver launches a file repair mechanism. It consists in requesting the packets that are missing or corrupted. According to the FLUTE terminology, these packets are named symbol. The request is sent to a repair file server using a point-to-point connection. The request gathers basically the name of the file to be repaired and the list of missing symbols.

The FLUTE protocol defines a File Delivery Table, noted FDT, which comprises file description information of the files which have to be transmitted within a file delivery session. FLUTE protocol transmits the FDT from the content server in a multicast mode to all the clients. As this may be subject to transmission error, the reliability of the FDT file transmission can be enhanced with mechanisms such as a forward error correction or with retransmissions of the FDT during the session, that are well known per se. So at the end of the multicast content delivery each client knows exactly, the files which have to be transmitted in the session and the files which have been received. Each client may then indicate to the index server the files that are missing.

The mechanism specified in the CDP standard requires that the receiver receives at least a packet of the file. If no packet has been received, the receiver can not immediately and accurately detect that a file has not been received.

SUMMARY OF THE INVENTION

The present invention attempts to remedy at least some of the concerns connected with the transmission to multiple receivers in the prior art, by providing a mechanism that improves the reliability.

The present invention concerns a method at a file server for sending more than one file to more than one receiver, comprising the steps of aggregating the files into a container, splitting the container into more than one packet, and transmitting the more than one packet to the more than one receiver, wherein, the reception of at least one packet of the container enables a receiver to request the reception of lost packets of the container. To this end, the method comprises the steps of receiving an indication of the number of consecutive lost packets of the container per the more than one receiver and adapting the size of the container, in function of the number of consecutive lost packets at the receivers.

Thus, the invention permits the server to adapt the aggregation size on the reception capability of the receivers. The reception environment at the receivers is variable. It is reported to the server that reacts to improve the transmission. The system of the invention permits to adapt the transmission parameters to the network environment. Packet loss burstiness is characterized in that most of the periods of packet loss are relatively short. The file aggregation technique ensures that small files are not completely lost in the frequent short loss periods, in which case repair is not possible.

According to an embodiment, the size of the container is further based on the number of receivers that report a number of consecutive lost packets above or below a default value.

According to an embodiment, if the number of receivers is above the default value, the size is decreased, and if the number of receivers is below said default value, the size is increased.

According to an embodiment, the size of the container is dependent on the reception buffer size of said more than one receiver.

According to an embodiment, the packets are transmitted with the File Delivery over Unidirectional Transport protocol, FLUTE protocol.

According to an embodiment, the step of receiving an indication comprises the step of getting, at a repair server, information on the repair requests received from the receivers.

According to an embodiment, the step of receiving an indication comprises the step of receiving, from the receivers a report on the number of consecutive lost packets.

According to an embodiment, the size of the container is initially set to a default value, and the size of the container can only be higher or equal to the default value.

The invention also concerns a DVB-H mobile terminal comprising communicating means for receiving files from a server, and communicating with the server, file reception computing means for checking the reception of file and file reception reporting means for reporting the files received or not to the server.

The invention also concerns a file server comprising communicating means for broadcasting more than one file to at least one receiver, the files being aggregated into a container, the container having a size, aggregating loss value computing means for adapting the size of the container to the number of consecutive lost packets at the at least one receiver and file aggregating means for building the container, splitting the container into more than one packet and sending the packets to the at least one receiver.

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

BRIEF DESCRIPTION OF THE DRAWINGS

The invention will be better understood and illustrated by means of the following embodiment and execution examples, in no way limitative, with reference to the appended figures on which:

In FIGS. 1 to 3, the represented blocks are purely functional entities, which do not necessarily correspond to physically separate entities. Namely, they could be developed in the form of hardware or software, or be implemented in one or several integrated circuits.

DETAILED DESCRIPTION OF PREFERRED EMBODIMENTS

The exemplary embodiment comes within the framework of DVB-H transmission, but the invention is not limited to this particular environment and may be applied within other frameworks where a server sends data into an aggregated manner to multiple receivers to improve the transmission reliability.

Figure 1:
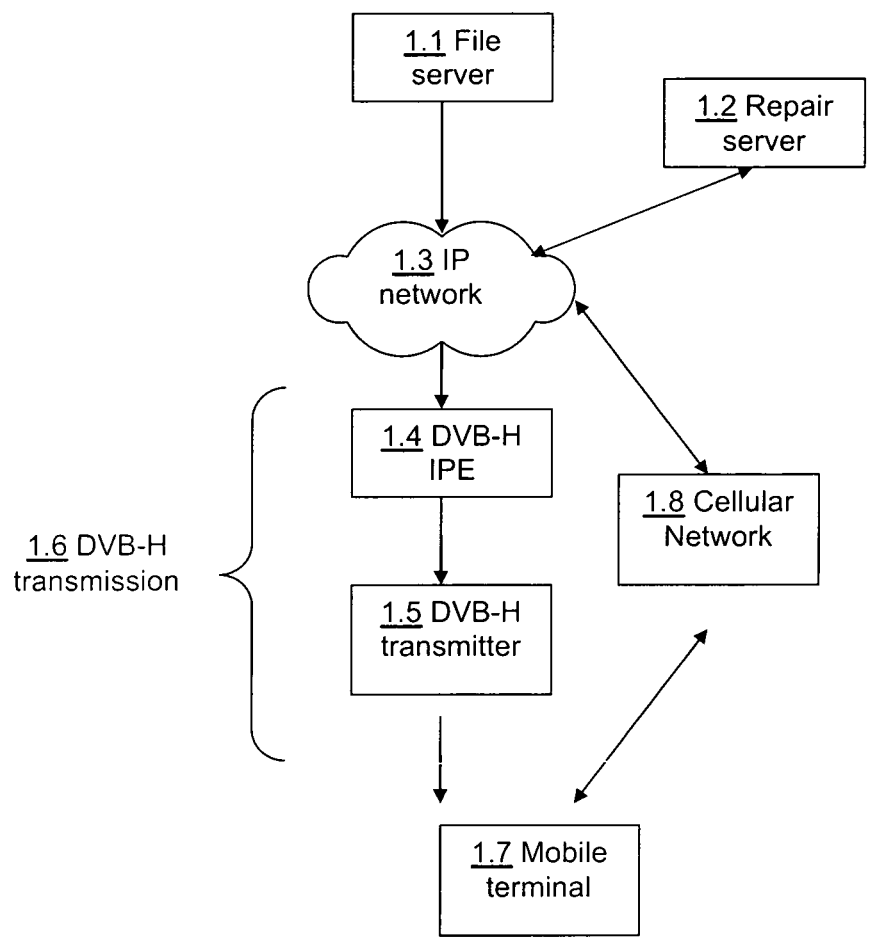
FIG. 1 represents a system for video distribution according to the embodiment.

The system for video distribution according to the embodiment is illustrated in FIG. 1. The video broadcast network 1.6 is compliant with the ETSI TR 102 469 V1.1.1 (2006 May), "Digital Video Broadcasting (DVB); IP Datacast over DVB-H: Architecture", noted IP datacast standard hereinafter.

The system is also compliant with the ETSI TS 102 472 V1.2.1 (2006 December), "Digital Video Broadcasting (DVB); IP Datacast over DVB-H: Content Delivery Protocols" noted CDP standard hereinafter.

The file server 1.1 sends data files according to the CDP standard and the FLUTE protocol. The data files are delivered to the mobile terminal 1.7 over the IP network 1.3 and the DVB-H broadcast network 1.6. The IP network may be any IP network supporting multicast transmission, such as the Internet. The DVB-H transmission network comprises among others a DVB-H IP Encapsulator 1.4 and a DVB-H transmitter 1.5. Of course, the embodiment is not limited to the DVB-H network. It could apply to any other broadband distribution network such as the digital subscriber line family.

The system also comprises a return channel through the cellular network 1.8. The mobile terminal may receive and send data through the return channel, in particular interactive data. Of course, the return channel might be any other type of channel that provides a point-to-point bidirectional connection. The system is a simplified file repair infrastructure associated with DVB-H as defined in CDP standard. The terminal submits the repair requests to a repair server 1.2 in order to recover packets, which are the FLUTE symbols, detected as missing or corrupted. The repair server stores a copy of the files that have been downloaded. The repair server sends back to the terminal the requested packets if available.

The mobile terminal transmits through the return channel among other the packet loss information that is defined hereinafter to the file server.

Figure 2:
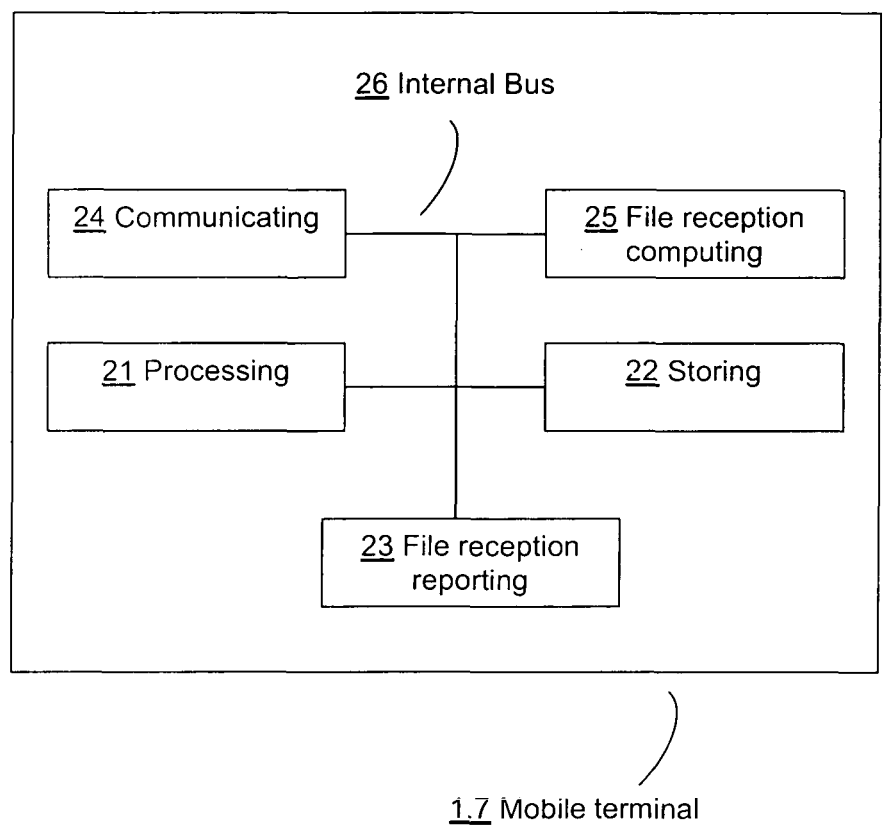
FIG. 2 represents a mobile terminal according to the embodiment.

The mobile terminal 1.7 is represented on FIG. 2. According to the embodiment, it is a terminal compliant with the IP datacast standards. It comprises a communicating module 24 for receiving data from the broadcast network, in particular the DVB-H network, and for sending and receiving data on the return channel, in particular the cellular network. It comprises a storing module 22 for storing data received from the broadcast channel, among others FDT and ESG information. The terminal comprises a processing module 21, and an internal bus 26 for allowing communication between modules. The terminal comprises a file reception computing module 25 for checking the file reception according to the embodiment. The terminal also comprises a file reception reporting module 23 for reporting the files that are received or not to the file server.

Figure 3:
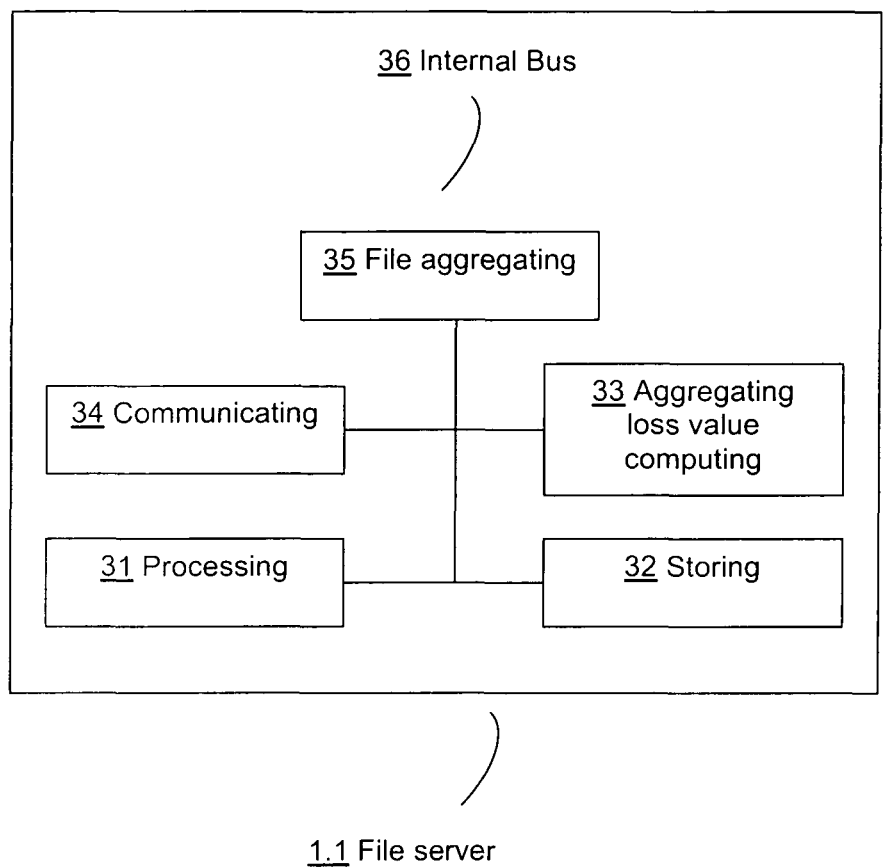
FIG. 3 represents a file server according to the embodiment.

The file server is represented in FIG. 3. It is compliant with the CDP standard. It comprises a communicating module 34 for communicating with the mobile terminal through the return channel, and for broadcasting content through the distribution channel. It comprises a storing module 32 for storing aggregation values and packet loss values received from the mobile terminal. The server comprises a processing module 31, and an internal bus 36 for allowing communication between modules. The server comprises an aggregating loss value computing module 33 for computing the aggregation value based on the consecutive lost packet of the container received from each of the mobile terminals. The aggregation value is further described hereinafter. The server comprises a file aggregating module 35 for building the aggregated file and sending that file to the mobile terminals.

The individual number of consecutive packet loss for a packet length X is noted INCPL-X. The INCPL-X is computed at the server. MSAF-X represents the minimal size of the aggregated file and is further described hereinafter. The value of MSAF-X is adjusted based on the INCPL-X values.

The number of consecutive packet losses corresponding to a particular occurrence threshold, noted T, and a typical packet length X, is noted NCPL-T-X. It is a constant value. For example, for broadcasted packet length of 1400 bytes, NCPL-80-1400 indicates the NCPL value for the related broadcast system and receivers, for which 80% of the consecutive packet loss periods observed from a receiver have "NCPL-80-1400" consecutive packets lost or less. According to FIG. 4, approximately 80% of loss periods have 162 packets or less; that is the value of NCPL-80-1400 has a value of 162. In other words, if NCPL-80-1400 is set to 162, 80% of the receivers will at least receive one packet. Here 1400 is the minimal length; which means that the value of NCPL-80-1400 applies to packets with a length superior or equal to 1400.

More generally, the computation of the set of NCPL-T-X values is based either on models confirmed by field measurements, or on dynamic evaluation based on regular measurements performed by the mobile terminals using that broadcast system.

The reception report information is provided to the server by the receiver. It is provided by each one of the receivers. It might be provided by only some of the receivers. The receiver uses the bi-directional link to send that information, in a so-called transparent mode or non-transparent mode.

In a non-transparent mode the mobile terminal transmits the reception report information using the bidirectional channel. The reception report information is periodical transmitted. It corresponds to a measurement report about recent file(s) reception.

One non-transparent mode is based on the fact that, in broadcasting, the list of files to be delivered or downloaded through the media and their scheduled delivery time is usually known in advance thanks to the electronic service guide, noted ESG, of other similar types of lists. The receiver detects whether it has received or not the file. Then it sends acknowledgement or non-acknowledgement information on the reception of the file to the file server. The terminal uses the reception reporting procedure as defined in chapter 7.4.3 of the ETSI TS102472 standard to report file delivery status. That standard defines file reception report with the reportType parameter. According to the embodiment, a reportType different from those of the standard is defined to report that a file has not been received. The reportType value is set to "rnack". Of course the terminal may also use the reception reporting procedure as defined in OMA-BCAST. When the file server receives the reports from the mobile terminals, it computes the INCPL-X value for each terminal during an observation period. Then it computes the MSAF-X value for the all file delivery system in order to drive the size of the next aggregated file to be broadcasted.

Another non-transparent mode to get such report at the server is to use the Real-Time transport protocol, RTP. It is based on monitoring the media related to a dedicated transmission. For example, successful reception of consecutive RTP packets of length Yn, for a terminal n, permits to compute an INCPL-Xn value for that terminal n. Associated RTCP receiver reports gather information on packet losses and then enables the file server to get en overview of the INCPL-X for each reporting receivers in the system.

In a transparent mode the mobile terminal submits the file repair requests to the repair server. The repair server computes the INCPL-X value for each one of the mobile terminal based on the repair request received form that terminal. The repair server computes the INCPL-X from repair requests as it is expected to know the original order of the FLUTE packet transmission. The repair server makes the set of values available to the server. The file server may retrieve the set of values periodically. The file server can then determine the new value of MSAF-X.

In an alternative, the repair server additionally computes the ratio Rref. The repair server then indicates the Rref value to the file server, with any IP notification mechanism well known per se.

According to the embodiment, at start-up, a NCPL-T-X value is provided to the server. That value is manually set-up by an operator through a graphical user Interface. Of course, it may be indicated to the server with a configuration file or through any local or remote configuration means.

That NCPL-T-X value is used to compute an initial minimal size for building the aggregated file(s) to be broadcasted towards receivers.

A tunable period is defined at the server. The period has a value that corresponds to the broadcast and repair period of 2 or 3 files. The tunable value may also be configured by an operator at the server. After the tunable period, the minimal size for aggregated file is dynamically tuned, with the information reported by the terminals.

The value of MSAF-X computed at the server always takes into account the capacity of each receiver buffer. The receiver buffer size is a configuration parameter set up by the operator and communicated to all the receivers and the server. Of course it might be dynamically setup at the server, on reception of maximal buffer size capability from the receivers.

Figure 4:
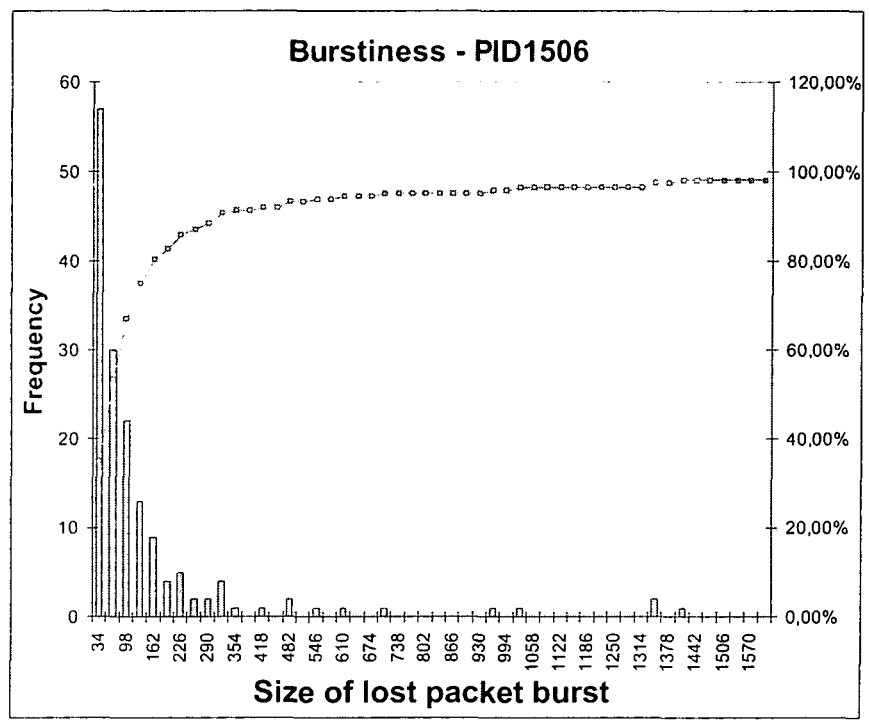
FIG. 4 represents the measurement report of packet loss burstiness.

The server is indicated a set of default NCPL-T-X values by an operator. This set of value permits the server to start sending aggregation packets. This set of values comes from a campaign measurement. An example of measurement may be conducted on a real DVB-H coverage area, which enables the basic characteristics of packet loss to be determined for such a network. Measurements are made by coupling an IP/RTP packet generator to the head-end transmission equipment and by recording the received packets at fixed and mobile points in the coverage area by means of a portable receiver. As each packet sent is individually numbered, analysis of the receiver logs enables the packet loss rate and the burstiness characteristics to be determined. FIG. 4 is an illustration of the measurement of packet loss burstiness, with 1400 bytes packets length. It shows that there is a high incidence of packet loss periods with a relatively small number of consecutive packet losses. Approximately 80% of loss periods have 162 packets or less. Thus, an occurrence threshold of 80% provides an NCPL-80-1400 value of 162. It yields an estimation of a NCPL-T-X value.

The INCPL-T-X computed for each receiver permits to determine then the value of MSAF-X. That value is increased or decreased. The MSAF-X represents the minimal size of the aggregated file. It corresponds to the number of packets of length X that are aggregated.

At startup, the value of MSAF-X is built using the NCPL-T-X value. The value of MSAF-X is higher than that of NCPL-T-X. It is set to MSAF-X=NCPL-T-X+N. N is set to 5. A high value of N increases the chance for clients to receive at least a packet of the aggregated file. However it requires a high buffer size at the clients. N should then be set to a value above 1, but under a threshold value that is set by the operator, and which is dependant on the receiver buffer size requirement.

Once chosen, that value is kept and used during the tunable period. As indicated above, the tunable period is set to the duration of broadcast of 2 or 3 aggregated files of size MSAF-X, and related repair period. It gives the delivery system the time to acquire reception reports from receivers through transparent, or non transparent methods.

Then, the server computes a reference ratio of receivers, noted R, for which the reported INCPL-X was higher than NCPL-T-X. That ratio, noted Rref, is used a reference at the next step.

Once the value Rref is acquired, the system periodically adapts the MSAF-X based on the following. At each period, R is computed with the last reception reports from receivers:
in a first case, R is lower than Rref. It means that for the past period fewer receivers were found to have a reported INCPL-X higher than the chosen NCPL-T-X. Then the MSAF-X value is decreased. Of course it does not take a value below NCPL-T-X+N.

in a second case, R is higher then Rref. It means that for the past period more receivers were found to have a reported INCPL-X higher than NCPL-T-X. Then MSAF-X is increased. Of course it does not take a value above the maximum file size value regarding memory constraint of receivers, if R has the same value as Rref, the value of MSAF-X remains unchanged.

The MSAF-X calculation could also be based on other mechanisms. It may be based as well on the reception report received from one receiver only, or a subset of the receivers. It enables then the server to drive the aggregation size without having a feedback from all the receivers. It optimizes the reporting mechanism, in that the reporting receivers are the ones that are considered reliable to the server.

The file grouping mechanism according to the embodiment is GZIP, the GNU ZIP free compression software. With GZIP format, the files are compressed. The server takes into account the size of the resulting compressed file. After having aggregated the N files into one, using GZIP, the file aggregator module stores the resulting file into the local storage using an automatic assigned name. The terminals use the GZIP format to detect that a transmitted object is an aggregated files object and thus triggers the file splitting function. The prefix of the name may be "GroupedFile_" and the suffix an integer incremented for each new aggregated files object.

The file aggregator may group files based on local rules. If the files are only announced with FDT files, the server may buffer the files and aggregate them, based on the file category. For example, the files corresponding to the same WEB page may be grouped together. If the files are announced with an ESG, the server may buffer and aggregate in such a manner only if the file transport is compliant with the ESG. The broadcast time of the file has to be compliant with the time indicated in the ESG.

More generally, any private or conventional file transport format is possible. The requirements attached to the file format are the following:

possibility to carry several components,
possibility to encode the name of each component, and
possibility to encode other information attached to each component.

Figure 5:
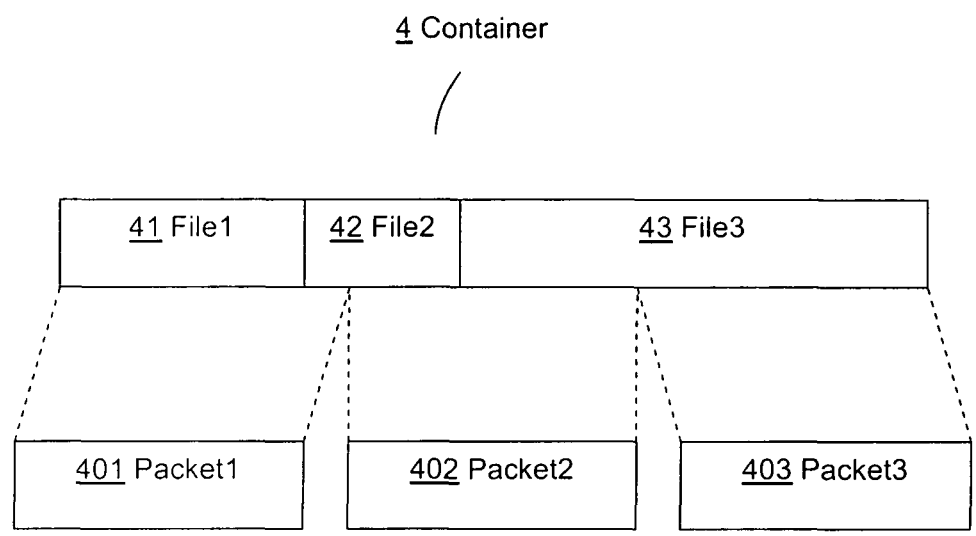
FIG. 5 represents a file aggregation according to the embodiment.

When built, the aggregated files are passed to the FLUTE stack for transmission to the receiver. An example of file aggregation is illustrated in FIG. 5. The file server aggregates the files into a container 40 in order to reach the length L, where L=X×MSAF-X, where X represent the packet length. The server aggregates File1, File2 and File3 into the container. The container is then split into three packets of length X, Packet1, Packet2 and Packet3; here MSAF-X value is 3.

The tunable mechanism described hereinabove is of course as accurate as the cells are small. Considering a mobile broadcast or multicast network, it is preferable to have an infrastructure of several files servers and related repair servers, each serving an area of at least one transmission point. In that case the NCPL-T-X and the MSAF-X may be estimated and provided for each area covered by each file server providing much more efficiency of the overall file distribution system. The service platform pushes the files to be transmitted in all file servers. Each file server gathers a file aggregator that maintains its own minimal size for aggregated file.

The mechanism as described hereinabove comes in the scope of DVB-H. Of course it applies to any system where a server broadcasts content in an aggregated manner to multiple receivers, and where receivers communicate to the server with a return channel. An example of such a system might be the aggregation of UDP packets, where the UDP packets are labeled, to enable a receiver to detect lost packets.

References disclosed in the description, the claims and the drawings may be provided independently or in any appropriate combination. Features may, where appropriate, be implemented in hardware, software, or a combination of the two.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

The invention claimed is:

1. A method at a file server for sending more than one file to more than one receiver, comprising the steps of:
aggregating said files into a container, said container being initialized to a default size,
splitting said container into more than one packet, and transmitting said more than one packet to said more than one receiver, wherein, a reception of at least one packet by any of said more than one receiver of the container enables said any one of said more than one receiver to request a retransmission of lost packets of the container;
the method further comprising the steps of:
receiving an indication of the number of consecutive lost packets of the container per at least one of said more than one receiver; and
adapting the size of the container, as a function of the number of consecutive lost packets received by at least one of said more than one receiver.

2. The method according to claim 1, wherein the size of the logical container is further based on the number of receivers that report a number of consecutive lost packets.

3. The method according to claim 2, wherein, if the number of receivers is above a reference value, the size is increased, and if the number of receivers is below said reference value, the size is decreased.

4. The method according to claim 1, wherein the size of the logical container is dependent on the reception buffer size of said more than one receiver.

5. The method according to claim 1, wherein the packets are transmitted with the File Delivery over Unidirectional Transport protocol, FLUTE protocol.

6. The method according to claim 5, wherein the step of receiving an indication comprises the step of getting information on the requests for retransmission received from said receivers.

7. The method according to claim 1, wherein the step of receiving an indication comprises the step of receiving, from said receivers a report on the number of consecutive lost packets 8. The method according to claim 1, wherein the size of the logical container is initially set to a default value, and the value of the size of the logical container can only be higher or equal to said default value.

9. A mobile terminal comprising:
a communicating interface configured to receive packets comprised in at least a first or a second container built and broadcasted by a server, and communicating with said server, said packets being part of a container, said container being an aggregation of more than one file, and a file reception computing module configured check the reception of said packet, wherein the mobile terminal further comprises:
  a file reception reporting module configured to report the number of consecutive lost packets of the container to the server.

10. A file server comprising:
a communicating interface configured to broadcast more than one file to more than one receiver, said files being aggregated into a container, said container, said container being initialized to a default size, and,
a file aggregating module configured to build said container, splitting said container into more than one packet and sending said packets to said more than one receiver; wherein the file server further comprises:
  an aggregating loss value computing module configured to receive an indication of the number of consecutive lost packets of the container per at least one of said more than one receiver, and adapting the size of the container to the number of consecutive lost packets at said more than one receiver.

* * * * *